United States Patent
Kitano et al.

[15] 3,637,243
[45] Jan. 25, 1972

[54] FREEWHEEL LOCK MECHANISM

[72] Inventors: Shin Kitano; Yutaka Momose, both of Kariya, Japan

[73] Assignee: Aisin Seiki Company Limited, Kariya-shi, Aichi-ken, Japan

[22] Filed: Apr. 20, 1970

[21] Appl. No.: 29,971

[30] Foreign Application Priority Data

Apr. 19, 1969 Japan..................................44/30560

[52] U.S. Cl..................................................287/53, 192/71
[51] Int. Cl...........................................................F16d 1/06
[58] Field of Search..............................287/53; 192/71, 114

[56] References Cited

UNITED STATES PATENTS

| | | | |
|---|---|---|---|
| 2,846,039 | 8/1958 | Requa et al. | 287/53 X |
| 2,907,432 | 10/1959 | Strickland et al. | 287/53 X |

*Primary Examiner*—Andrew V. Kundrat
*Attorney*—Sughrue, Rothwell, Mion, Zinn & Macpeak

[57] ABSTRACT

In the freewheel lock mechanism a split locking ring is provided intermediate a hub on the drive shaft and a flange on the wheel hub. A pawl is slidably mounted in a radial direction in a slot in the flange and is arranged to be moved into a first position intermediate the ends of the split locking ring to couple the locking ring to the flange and a second position wherein the pawl is completely withdrawn from the locking ring to thereby disconnect the drive between the locking ring and the flange. A spring member is connected to the pawl and a manually operated handle is provided for controlling the spring member which in turn will control the position of the pawl relative to the locking ring.

3 Claims, 17 Drawing Figures

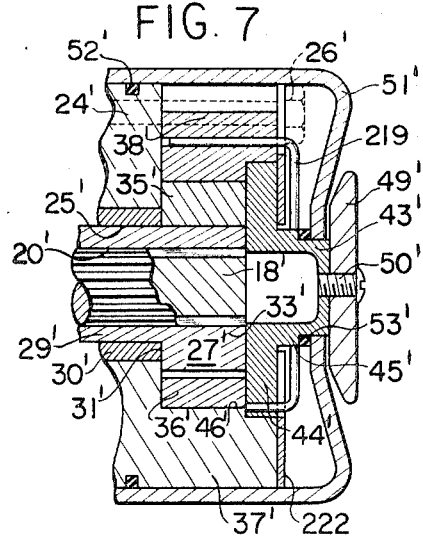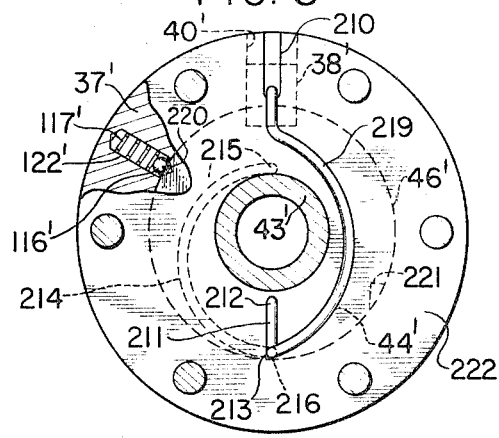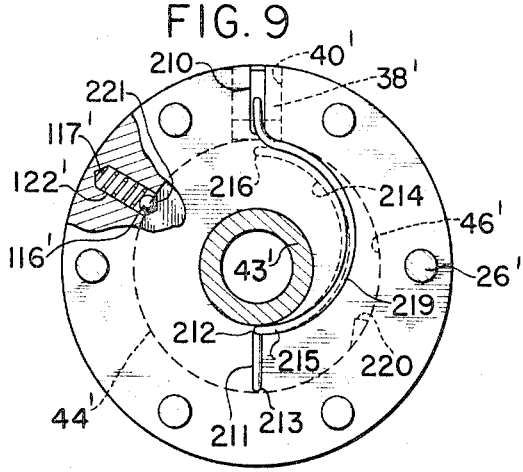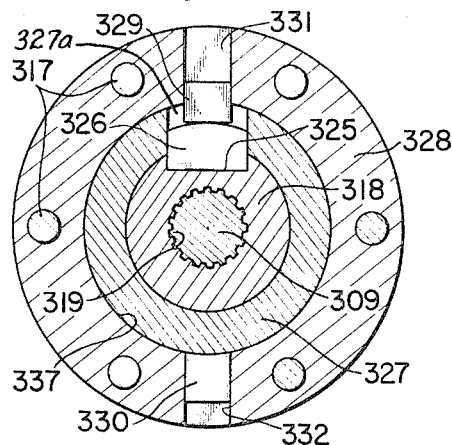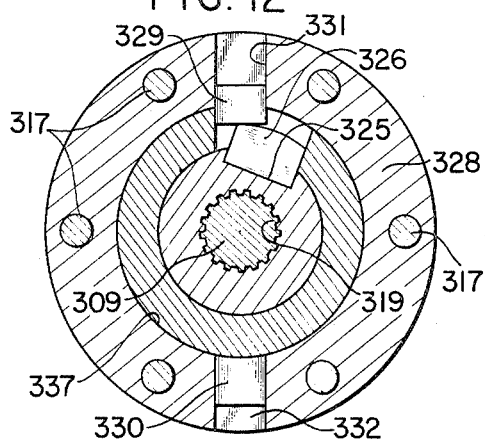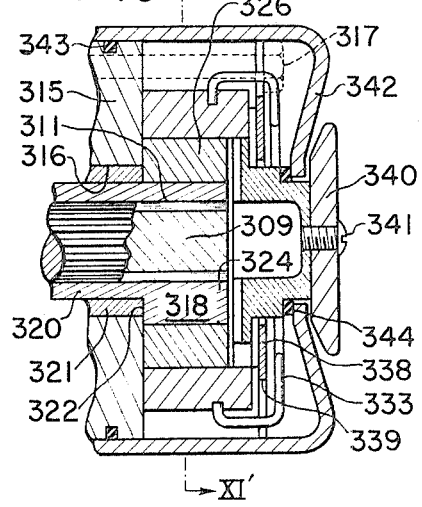

FREEWHEEL LOCK MECHANISM

This invention relates to a freewheel lock mechanism adapted for changeover control between the two-wheel drive and the four-wheel drive on an automotive vehicle.

This invention is characterized by the provision of an expandable and contractable brake member which is subjected to intentional deformation for selective drive connection and drive interruption between a drive shaft and a related vehicle wheel for bringing the related differential gearing into operation or release by turning a handle or other turnable control means.

This invention relates to a freewheel lock mechanism so designed and arranged as to manually on-off control a wheel, pulley or the like rotatable means mounted on a drive shaft provided between a conventional differential gearing and one of the vehicle wheels. It concerns more specifically with the freewheel lock mechanism adapted for use on a four-wheel drive type automotive vehicle for the manual on-off control of the turning torque between the vehicle wheel and the differential gearing.

The four-wheel drive type automotive vehicle is substantially used in practical and frequently called "Jeep." With this kind of four-wheel drive automotive vehicle, the front- or rear-wheel drive mode is used for travel along common road surfaces, especially when requiring a rather smaller driving torque. On the other hand, when the vehicle is loaded heavily, or running along a steeply rising road surface or on a snow-covered or muddy travelling surface, requiring a rather heavier driving power, the four-wheel drive mode is selectively and advantageously employed.

When the front-wheel or rear-wheel drive is brought into actuation for vehicle running, the drive shaft means related with the nondriven vehicle wheels, as well as the related front or rear differential gearing are in its idle position. Noneffective torque caused by such idling is not so small as can be neglected.

Various prior mechanisms have been developed in the shape of a freewheel lock mechanism which is mounted between the drive shaft and the related wheel hub and capable of interrupting the front- or rear-wheel drive from the drive shaft and the related differential when the vehicle is to travel under the normal or lighter duty running condition, so as to keep the drive shaft and the differential in their nonoperative condition. This mechanism can operate further so that in the case of four-wheel drive mode, the wheel hub is brought back into the operative relation with said both working members.

With the use of such prior improved mechanism, it has been, however, encountered that when the vehicle is in its stopped condition under such condition wherein there is maintained a considerable friction acting between the driving means and the driven means comprised in the mechanism, a manipulation of a manual control means for effecting the required changeover operation may be effected only with a considerable difficulty. It is necessary in such case to move the vehicle a small distance forwards or backwards and only upon lapse of a certain short time period for releasing the rather heavy frictional resistance in the above sense, the manual control means such as a control wheel can be manipulated. This means naturally a considerable drawback of the prior art.

The main object of the present invention is to provide a mechanism of the kind referred to, capable of obviating the aforementioned conventional drawback.

These and further objects, features and advantages of the invention will become more apparent when reading the following detailed description of the invention by reference to the accompanying drawings, in which:

FIGS. 1–6 represent a first embodiment of the invention.

More specifically, FIG. 1 is a longitudinal section of the essential parts of the mechanism according to this invention.

FIGS. 7–9 illustrate on second embodiment of the invention in the mode similar to FIG. 3, showing several working modes of the mechanism.

FIG. 10 is a similar view to FIG. 1, yet showing a third embodiment.

FIGS. 11 and 12 are similar views to FIG. 2, showing two different working modes of the mechanism.

In the following, several preferred embodiments will be described by reference to the accompanying drawings.

At first, a first embodiment of the invention will be explained with reference to FIGS. 1–6 of the drawings.

Figure 1:
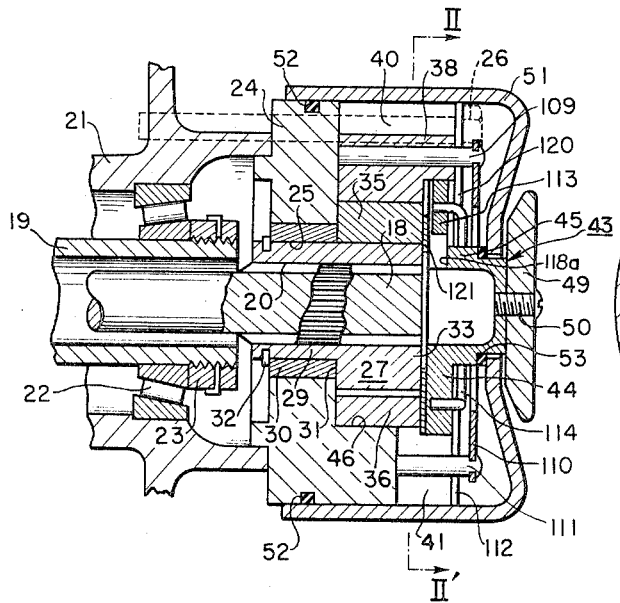
Figure 2:
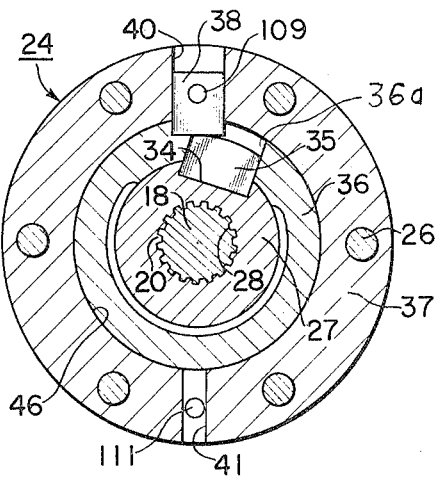
FIG. 2 is a cross section of the mechanism, taken substantially along a section line I—I' in FIG. 1.
Figure 3:
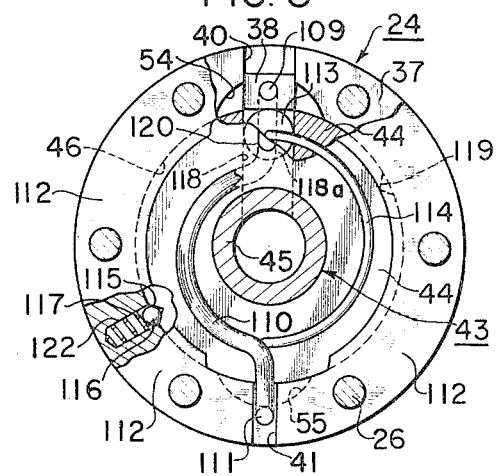

In FIGS. 1–3, the numeral 18 denotes a drive shaft which extends horizontally along the central axis of a tubular housing 19, the outer end of said shaft being formed with a spline joint at 20. The inner end of the drive shaft is connected through a universal joint, not shown, to a conventional differential gearing for allowing the vehicle wheels, not shown, to be driven as conventionary.

Vehicle wheel hub 21 is rotatably mounted through a roller bearing assembly 22 on the shown end of said housing 19. The bearing assembly 22 is prevented from slipping out of position on the housing 19 by means of a stop ring 23 which is fixedly attached to the end of said housing 19 by screwing.

Drive flange 24 comprises a cylindrical part 37 defining an inside cylindrical surface 46, said cylindrical part being formed therein a pair of grooves 40 and 41 diametrally oppositely arranged to each other, as most clearly seen from FIG. 2. This drive flange 24 is fixedly attached onto the cylindrical end surface of said wheel hub 21 by means of fixing bolt means 26.

Tubular member 27 comprises a larger diameter portion 33 and a smaller diameter portion 29 made integral with each other, the inside tubular surface of said member being formed with axially directing spline groove 28 adapted for engagement with said spline connection at 20.

The drive flange 24 is slidably mounted on said smaller diameter portion 29 through a bushing 30 held in position by means of a stop ring 32 and the shoulder 31 defining the critical surface between said larger and smaller diameter portions 33 and 29. Said tubular member 27 is formed with an axially directing key groove 34 formed on said larger diameter portion 33, adapted for receiving a conventional key 35.

There is formed a ring-shaped idle space between the outer periphery of the larger diameter portion 33 of said member 27 and the inside smaller diameter cylindrical surface 46 of said drive flange 24, a brake member 36 having a substantially tubular cross section, yet being formed with a radial slot 36a extending also axially so as to procure a certain degree of resiliency, is inserted within said idle space, as will be clearly understood by reference to FIG. 2. It should be mentioned that under nondriving conditions, said brake member 36 is rotatable, since, in this case, there is provided a small free gap between the inner surface of the drive flange 24 and the outer peripheral surface of the brake band 36. The width of said slot 36a of brake member 36 is designed larger that that of the key 35 fitted to said tubular member 27. The key 35 has its height smaller than the thickness of the brake member 36, said key being slightly curved at its upper surface as shown.

An engageable member 38, hereinafter briefly referred to as "pawl member" throughout this specification, has a substantially rectangular cross section as a preferable embodiment thereof, is received in the slot 40 in radially slidable way, said pawl member having a pin 109 inserted axially therein. This pin 109 is attached fixedly with its one end to a connection member 110 having at its opposite end a similar pin 111 which is fixedly attached thereto. This pin 111 is inserted within the groove 41 in a radially slidable way.

The width of this groove 40 is selected to be smaller than the width of the key 35.

Manually operatable means, generally shown at 43, comprises a circular disc plate 44 having a radially directing guide groove 118 on its one surface; a boss 45 made integral with the disc plate 44; and a manually operatable control wheel or handle 49 attached fixedly to said boss 41 by means a setscrew 50.

Said means 43 is naturally rotatable together with its disc plate member 44, a separator ring 121 being provided between the inner end of the disc 44, on the one hand, and said members 27 and 36, on the other hand. Two half rings 112 are fixedly attached to the end surface of said drive flange 24 by the aforementioned bolts 26, for maintaining the disc plate 44 in position.

A roller member 113 is arranged to be radially movable in the guide slot 118 of disc plate 44, the range of axial displacement of the roller member being limited by the outer wall part 118a partially defining said guide slot 118, on the one hand, and by the separator plate 121, on the other hand. A curved springy wire rod 114 is embedded with its one end in the mass of disc plate 44, while the opposite end of said wire rod passes through a radial groove 120 into the mass of said roller member 113 at its center with a certain radial preloading effect. Two peripheral grooves 115 and 119 are formed on the outer peripheral surface of disc plate 44 in a diametrally opposite arrangement to each other. A blind hole 122 is bored radially into the mass of the cylindrical part 37 of said drive flange 24, as most clearly seen from FIGS. 3 and 5 and a ball member 116 is partially inserted in the hole 122 and backed up by a coil spring 117 completely inserted in the blind opening, said ball being kept thereby in pressure contact with the outer peripheral surface of said disc plate 44 which can be held in two positions by the engagement of said ball 116 with the recess or groove 115 or 119.

At the inner end of each of said groove or slot 40 and 41 and at the both sides thereof, there are formed guide recesses, commonly shown 54 or 55, respectively, having each a partially cylindrical wall surface and adapted for guiding said roller member 113.

A substantially cup-shaped cover member 51 is attached fixedly onto the outer peripheral surface of the cylindrical portion of drive flange 24 in a sealed way by the provision of conventional sealing means 52, for the protection of inner main working parts from occasional invasion of outside foreign particles and/or moisture.

The operation of the first embodiment so far shown and described is as follows:

When the vehicle is to run under regular travelling conditions exclusively with use of the rear-wheel drive, the driver must operate, as a preliminary manipulating measure, a conventional four-wheel drive changeover mechanism, not shown, provided between conventional power transmission, not shown, and conventional front-wheel differential gearing unit, not shown, so as to release the front-wheel drive from the driving system of the vehicle.

Figure 6:
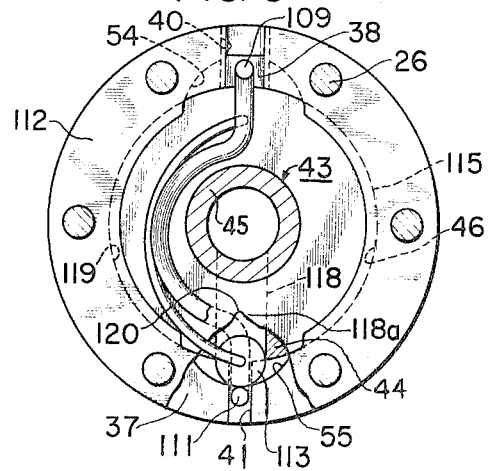
Figure 16:
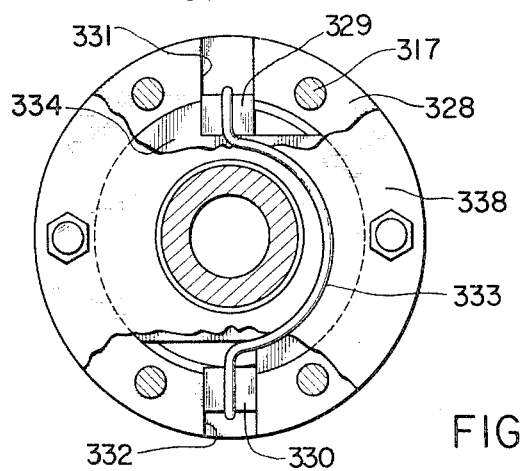
FIG. 16 is a partially sectional end view of the assembly of main working parts of the third embodiment.
Figure 13:
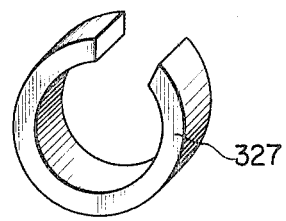
FIG. 13 is a perspective view of a brake member employed in the third embodiment.
Figure 14:
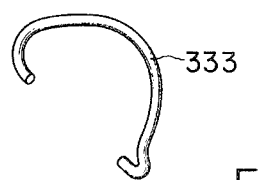
FIG. 14 is a perspective view of a wire spring employed in the third embodiment.

Then, he manipulates the handle 49 so as to turn it, together with the disc portion 44, a half revolution in the counter clockwise direction from the position shown in FIG. 6. At the completion of this manipulation, the ball 116 will be brought into engagement with a notch 115 formed on the member 44. The presently set position is shown in FIG. 3.

Then, the roller member 113 subjected to a radially outwardly directing urging force exerted by the wire spring 114, is brought into pressure contact with the bottom surface of pawl 38, upon performing a rolling movement along the inside peripheral surface of drive flange 24. This final position of the roller member is shown in FIG. 3. In this way, the pawl 38 is urged to move in the upward direction. Should, in this case, the pawl member 38 be kept in engagement with brake member 36, thereby the pawl 38 being subjected to a considerable resistance to its movement, the pawl 38 will be held in its locked position shown in FIG. 3. When, however, the vehicle is moved anyway in its front or rearward direction upon performing of the aforementioned setting manipulation, the said resistance will disappear and the pawl 38 will be moved outwardly under the influence by the urging force exerted by the roller member 133 onto the pawl, thereby the brake member 36 being freed from rigid engagement with the drive flange 24.

In this way, the drive flange 24 hitherto held in fixed relation with the wheel hub 21 will become freely rotatably, indeed, through the intermediary of bushing 30 on the smaller diameter cylindrical part 29 of tubular member 27. Therefore, when the vehicle is moved forwardly or rearwardly as may be required by occasional demands, under these operational conditions, the drive flange 24 may be rotated only freely, without affecting in any way upon the drive shaft 18 and the related differential gearing which both are not caused to rotate.

When the aforementioned resistance is absent, the pawl 38, upon affected in the above manner, will be shifted instantly upwards, and thus, similar operational effect as above described will be brought about.

When it is desired to drive the vehicle with four wheel drive, as may be required to travel along a steeply rising road, a snow-covered or muddy road, or the like unfavorably conditioned travelling surface, the aforementioned changeover mechanism, not shown, is so manipulated that the four wheel drive is brought into operation, as conventionally with use of the present style of the vehicle to which the subject matter of the application can be applied.

Figure 4:
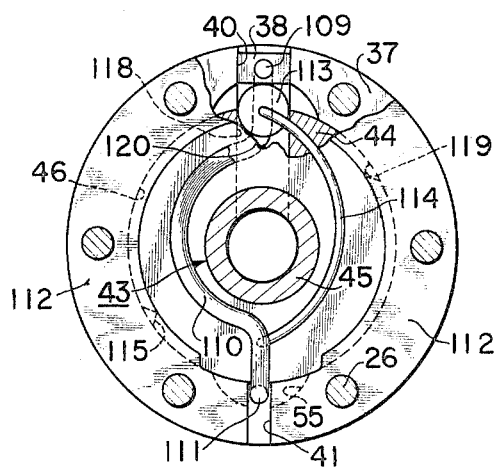
FIGS. 3–6 are similar views to FIG. 2, showing several working modes of the mechanism.
Figure 5:
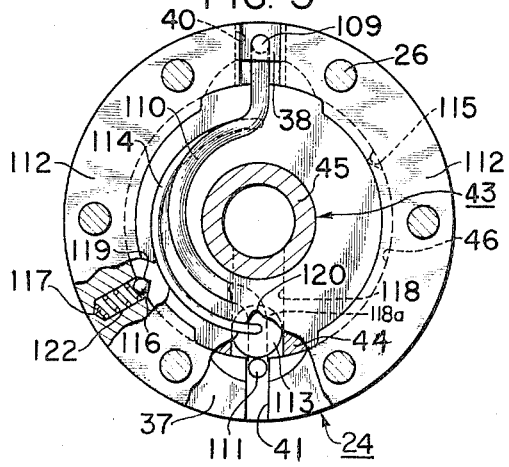

Then, the driver manipulates the handle 49 so that the disc plate portion 44 together with the manipulating mechanism 43 is rotated just a half revolution in the clockwise direction from the position shown in FIG. 4, thereby the ball 116 being brought into engagement with notch 119 formed on said plate portion 44. This set position is shown in FIG. 5. During the progress of the aforementioned setting operation, the roller 113 is depressed into the guide slot 118 against the outwardly directing urging force exerted by the spring 114 as it is transferred along one of the guide recesses 54 onto the inner peripheral surface of drive flange 24, thence rolling along said peripheral surface under pressure. At the final stage of said manipulation, as shown in FIG. 5, the roller 113 is brought from inside into pressure contact with the pin 111 so that the latter is urged radially outwardly. Under these operating conditions, motion is transmitted from the pin 111 through the connection member 110, preferably a rigid strip, to the pawl 38 which is thus urged to move radially and inwardly under the urging action of the wire spring 114 so that the pawl would be urged to advance into the slot 36 a formed in the brake member 36, if this slot should occupy a proper rotational position allowing such advancement of the pawl, so as to be brought into pressure contact with the upper surface of the key 35 of tubular member 35. As it may be imagined, when the slot opening of the brake member 36 is not positioned at a proper and registering phase with the pawl 38, the latter is brought into pressure engagement with the outer peripheral surface of the brake member 36. When the vehicle performs a forward or rearward movement under these operating conditions, as the case may be, the pawl will be, upon lapse of a very short time period, brought into registration with the slot of the brake member and then advance instantly into the slot. When this occurs, torque will be transmitted from the drive shaft 18 through tubular member 27, key 35, one of the slot-defining walls of the brake member, the other of said walls, pawl 38, and the cylindrical part 37 of driving flange 24 to wheel hub 21. On the other hand, the torque transmitted from the said drive shaft 18 will act to expand the brake member 36 outwardly, thus the outer peripheral wall of the brake member is brought into pressure contact with the inside peripheral surface of the drive flange 24, thus a part of said torque being transmitted indirectly through frictional contact to the wheel hub 21. This additional operation serves for substantially reducing the shearing force which is applied to the pawl 38 during the aforemention mode of operation in the aforementioned mechanism.

It will be clear from the foregoing that with use of the mechanism so far shown and described, the disc plate portion 44 of the manipulating means 43 can be rotated there together, by manually turning its handle or manipulating wheel 49, irrespective of the engagement or nonengagement of said brake member 36 and thus be set to the desired position as was above referred to. At the same time, the roller member 113 inserted within the guide slot 118 of the plate 44 will act to urge, under the action of spring 114, the pawl 38 inwardly or outwardly and directly or indirectly, thereby the required engagement of disengagement of the pawl with or from the brake member 36, as the case may be, being positively brought about in an automatic way. Therefore, even if the vehicle is kept in any stopped state, the control handle 49 can be operated in a lighter and more easy way and the desired on-off control of drive torque can be automatically realized to the manipulation of said handle 49.

Next, a second embodiment of the invention will be described by reference to FIGS. 7–9.

In these figures, the numeral 43′ denotes a manipulating means which is adapted for performing a similar function as that of the means denoted 43 in the foregoing embodiment. This means 43′ comprises a disc plate portion 44′ having a spiral groove 214 (FIG. 8); a boss 45′ made integral with said portion 44′ as before; and a manually operatable wheel or handle 49′ attached fixedly to said boss by means of a fixing screw 50′ again as before. Several parts denoted 24′, 26′, 27′ and 46′ are similar in their design and function to those denoted 24, 26, 27 and 46 in the foregoing first embodiment. A disclike cover plate 222 is fixedly attached to the outer end surface of the drive flange 24′ by means of several fixing bolts 26′.

A curved wire spring 219 extends with its one end through a radial slot 210 cut in the cover plate 222 axially into the mass of an engageable member 38′ at its center, hereinafter referred to as "pawl" throughout this specification as before, said pawl being slidably mounted in a radial groove 40′ formed in the cylindrical part 37′ of the drive flange 24′ as before, while the opposite end of the wire spring passes through an radially extending guide slot opening 211 formed in the cover plate 222 into the spiral cam groove 214 for being guided thereby. The guide slot 211 extends, when seen endwise of the whole mechanism, substantially between the outer periphery of boss 45′ and that of the disc plate portion 44′. The spring 219 and its related parts are so designed and arranged that the corresponding end of the spring 219, which is being guided by the cam groove 214, is positioned at the middle point between the both end extremities of said guide slot 211, it provides no urging force. When, however, the spring end under consideration is positioned at the inner end 212 of guide slot 211, it exerts an outwardly and radially directing urging force. On the other hand, when the spring end is positioned at the outer end 213, it provides an inwardly and radially directing urging force.

A pair of diametrally opposite notches 220 and 221, similar to those shown at 115 and 119, respectively in the foregoing first embodiment, are cut in the outer peripheral surface of the disc plate portion 44′. The provision of ball 116′; and spring 117′ and blind hole 122′ is similar to those shown at 116; 117; and 122 in the foregoing first embodiment. The ball 116′is normally held in engagement with either of said notches 220 or 221 so that the drive flange may be positively and selectively positioned at either one of two diameterally opposite positions. Other constituent parts are designed and arranged substantially in the similar way as before so that no further analysis thereof may be necessary for the understanding of the present second embodiment.

The operation of the second embodiment mechanism is as follows.

The position shown in FIGS. 7 and 8 is such that the pawl 38′ and the brake member 36′ are kept in engagement with each other. When the driver turns, under these conditions, the handle 49′ together with disc plate portion 44′ a half revolution from the position shown in FIG. 8 to that shown in FIG. 9, the ball 116 is brought into engagement with the recess 221 and the related working parts are set to the position shown in FIG. 9. During the above manipulating period, the spring end is actuated upon by the cam groove 214 so that it is positioned at the end 212 of the guide slot 211, thereby the spring 219 providing a radially and outwardly acting urging force, as referred to hereinbefore. If, at this stage, the pawl 38′ is kept in such position as being subjected to a considerable friction force by the engagement with brake member 36′, the pawl is kept as before at its locked position shown in FIG. 8. When, however, the vehicle is moved under these operating conditions, forward or rearward, as the case may be, upon completion of the above setting operation and elapse of a certain time period counted therefrom, the pawl is released from said engagement and thus moved automatically outwards in the radial direction under the influence of the spring force at 219. In this way, the brake member 36 is freed from its locked position.

Now assuming that the working parts of the mechanism are positioned in the released condition as shown in FIG. 9. When the driver manipulates the handle 49′ to bring the disc plate portion 44′ from the position shown in FIG. 9 to that which is offset a half clockwise revolution from the position shown in FIG. 9 so that the ball 116′ is brought into engagement with notch 220, as shown in FIG. 8, the end of wire spring 219 will be transferred to the opposite end 213 of guide slot 211, thereby the spring providing an inwardly and radially directing urging force onto the pawl 38′. Therefore, this pawl 38′ will be moved inwardly towards the central axis of the whole mechanism and advance into the radial slot in the brake member 36′ and finally brought into pressure contact with the upper surface of the key 35′ for said tubular member 27′. Therefore, the mechanism is brought into its locked position as shown in FIGS. 7 and 8. Other functions of the present embodiment are substantially similar to those of the foregoing first embodiment so that the invention can be understood well as before.

Finally, a third embodiment of the invention will be described by reference to FIGS. 10–17.

Referring to FIGS. 10–12, the numeral 309 represents a drive shaft extending along the central axis of a tubular housing (not shown) similar to housing 19 in FIG. 1 and formed at its outer end with a spline connection 311 as before. Although not shown, the inner end of the drive shaft is mechanically connected through a universal joint, not shown, to a conventional differential gearing, not shown.

A vehicle wheel hub, a roller bearing assembly, a stop ring and a tubular housing such as shown, respectively, at 21, 22, 23 and 19 in the first embodiment, are also provided, although omitted from the drawing only for simplicity.

Drive flange 315 is formed with a central and axial bore 316 and attached fixedly onto the outer end surface of a wheel hub, not shown, by means of a plurality of fixing bolts 317, as in the similar way as before.

The spline connection at 311 formed on the outer end of drive shaft 309 is kept in mesh with the correspondingly splined connection at 319 of a tubular member 318 which is similar to that shown at 27 in the first embodiment. The tubular member 318 comprises a smaller diameter tube part 320 which has naturally a cylindrical outer surface and mounts rotatably said drive flange through the intermediary of a bushing 321 which is similar to that shown at 30 in the first embodiment.

The bushing 321 abuts against a shoulder 322 formed on the tubular member 328 and is kept in position by a stop ring, not shown, which is designed and arranged in the similar way as that shown at 32 in FIG. 1.

Larger diameter portion 324 of tubular member 318 has naturally a cylindrical outer surface which is formed with an axially extending key groove 325 receiving a key 326. A brake member 327 having an open ring cross section as in the similar way with the foregoing embodiments represents a radial slot 327a and is inserted in the ring space formed between the inside peripheral surface of drive flange 315 and the larger diameter portion 324 of said tubular member 318. These related parts are so designed and arranged that there are small idle plays around the brake member 327 when the mechanism is in its nondriving condition, the last-mentioned member may be rotatable with easiness. The width of the slot of brake member is naturally not smaller than the width of the key 326 and the height of the latter is less than the wall thickness of the brake member as before. The upper surface of the key represents a curve again as before.

The tubular part 328 of drive flange 315 is formed as before with two diametrally opposite recesses or grooves 331 and 332 receiving engageable members or pawls 329 and 330, respectively, for allowing radial movement thereof for the purpose of on-off control of the input driving, as will be more fully described hereinafter. The width of each of these radial grooves is selected to be smaller than that of key 326. A curved wire spring 333 shown most clearly in FIGS. 14, 16 and 17 engages at its both ends with the respective outer end surfaces of pawls 329 and 330 so that these pawls are subjected to an inwardly and radially directing urging force and kept in engagement with the slot 327a of the brake member.

Figure 15:
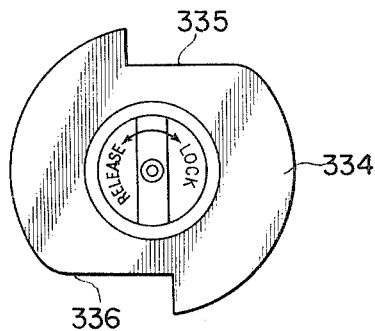
FIG. 15 is a front view of a cam means employed.
Figure 17:
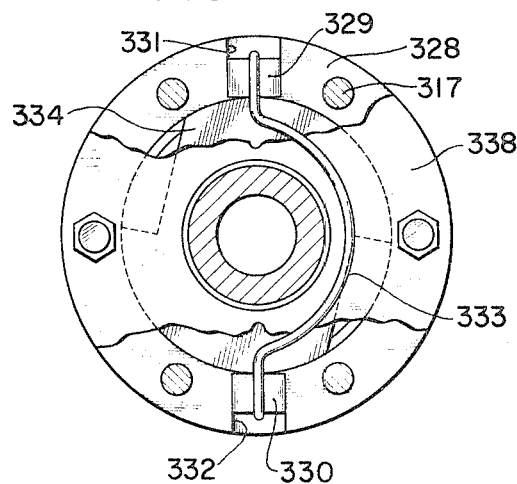
FIG. 17 is a similar view of FIG. 6, showing the freed position of the mechanism.

Cam 334 most clearly seen from FIG. 15 is formed with a pair of notches 335 and 336 apart 180° from each other. These notches are so formed that when the pawl 329 or 330 is positioned in engagement with the respective radial grooves in the brake member 327 and the cam 334 is allowed to rotate freely in one direction only. This cam 334 is rotatably mounted within the interior space of the larger diameter portion 337 of drive flange 315 and at the outer portion thereof, as will be easily understood by reference to FIGS. 16 and 17, a centrally bored disc plate 338 preventing the cam from being slipped out from position. The disc plate 338 is attached fixedly to the drive flange 315 by said fixing bolts 317 and formed with a comparatively larger recesses 339 arranged diametrally opposite to each other, for allowing the passage of the ends of wire spring 33 and for the attachment thereof to the pawls 329 and 330, as was referred to above. For providing manipulating possibilities to the cam 334 which is fixedly attached with a manipulating member 340 such as a handwheel, handle or the like, by means of a fixing screw 341. Cup-shaped cover means 342 is attached to the mechanism for the sample purpose as before, such as at 51 in FIG. 1. Sealing means 343 corresponds to that shown at 52 in FIG. 1.

The operation of the third embodiment is as follows.

When it is desired to run the vehicle relying upon the rear-wheel drive mode, a four-wheel drive changeover mechanism positioned between the conventional power transmission and the front-wheel differential gearing, so as to interrupt the drive connection of the front-wheel drive as before.

Then, the manipulating means 340 is turned manually in its releasing direction, so as to displace the pawls 329 and 330 against the action of wire spring 333 to the position where these pawls are brought into contact with the outer peripheral surface of the cam 334, thence into the radial grooves 331 and 332, respectively. In this way, these pawls are released from engagement with the respective radial slots, thus the drive flange 315 is fixedly attached to the wheel hub, not shown, being brought into its freely rotatable position on the small diameter portion 320 of tubular member 318. When the vehicle is moved forwards or rearward, as occasion may desire, said drive flange is rotated correspondingly, but the drive shaft 309 and the differential, not shown, are not rotated in any way.

When, on the contrary, the four drive mode should be utilized, the aforementioned four-wheel drive changeover mechanism, not shown, is operated as conventionally, so as to bring the front and the rear-wheel drive system into effect.

Then, the manipulating means 340 is so turned that the pawls 329 and 330 are brought into registration with recesses 335 and 336 in the cam 334, respectively, whereupon these pawls will advance, under the influence of the urging force exerted by the wire spring 333, into these recesses for attaining the desired locking purpose. When the vehicle is moved forwards or rearwards, these pawls 329 and 330 are brought into engagement with the wall defining the radial slot 327a. Therefore, drive torque transmitted through the drive shaft 309 will be further transmitted through tubular member 318, key 326, a slot-defining wall of brake member 327, the opposite side slot-defining wall of the brake member, and pawl 329 or 330, to the outer cylindrical portion 328 of drive flange 315 thereby the brake member being expanded against its own resiliency and the outside peripheral surface of the member being brought into pressure engagement with the inside peripheral surface of the drive flange. Therefore, a part of the transmitted torque is further transmitted indirectly through the functional engagement thus invited, to the wheel hub, not shown. In this way, otherwise invited large shearing force in the pawl 329 or 339 can be reduced to a smallest possible value.

The embodiments of the invention in which an exclusive property or privilege is claimed are as follows:

1. Freewheel lock mechanism adapted for use on an automotive wheeled vehicle, and provided between a drive shaft and a wheel hub, said mechanism comprising in combination:
    1. a drive flange rotatably mounted on a said drive shaft;
    2. a central opening formed through said drive flange for allowing one end of said drive shaft to extend outwardly of and through said drive flange;
    3. a radial groove formed on said drive flange;
    4. pawl means slidably mounted along said groove;
    5. spring means connected to said pawl means and providing a resilient inwardly directing urging force thereto;
    6. a tubular member attached to the outer end of said drive shaft and thus being rotatable therewith;
    7. a connection member shaped into an open ring and inserted between said tubular member and said drive flange, a radially extending slot being formed between the open ends of said connection member;
    8. a key fixedly attached to said tubular member and adapted for being brought into contact with said ring-shaped connection means; and
    9. a cam means adapted for moving said pawl means in the radial direction of the lock mechanism.

2. Free wheel lock mechanism adapted for use on an automotive wheeled vehicle and provided between a drive shaft and a wheel hub, said mechanism comprising in combination a drive flange rotatably mounted on said drive shaft, a central opening formed through said drive flange for allowing one end of said drive shaft to extend outwardly through said drive flange, radial groove means formed on said drive flange, pawl means slidably mounted along said groove means, a tubular member attached to the outer end of said drive shaft and arranged for rotation therewith, a connection member shaped into an open-ended ring and inserted between said tubular member and said drive flange, a radially extended slot being formed between the open ends of said connection member, a projection formed on said tubular member and adapted for being brought into contact with said ring-shaped connection means, spring means adapted to urge said pawl means in a radial direction along said groove means, and manually operable means for setting up the locking or unlocking position of the lock mechanism.

3. Freewheel lock mechanism adapted for use on an automotive wheeled vehicle and provided between a drive shaft and a wheel hub, said mechanism comprising in combination a drive flange rotatably mounted on said drive shaft, a central opening formed through said drive flange for allowing one end of said drive shaft to extend outwardly through said drive flange, radial groove means formed on said drive flange, pawl means slidably mounted along said groove means, a tubular member attached to the outer end of said drive shaft for rotation therewith, said member being provided with a recess for engaging with said pawl means so as to couple said member for rotation with said drive flange, a single spring means adapted to urge said pawl means in a radial direction, and manually operable means for changing the position of said spring means and setting up the locking or unlocking position of said lock mechanism whereby said spring means will urge said pawl means to engage with said recess upon moving said manually operable means to the locking position and will urge said pawl means to disengage from said recess upon movement of said manually operable means to the unlocking position.

* * * * *